(12) United States Patent
Charbonneau et al.

(10) Patent No.: US 7,430,667 B2
(45) Date of Patent: Sep. 30, 2008

(54) MEDIA ROUTER

(75) Inventors: Marc Laurier Charbonneau, Casselman (CA); Scott Newman Ashdown, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 639 days.

(21) Appl. No.: 10/115,237

(22) Filed: Apr. 4, 2002

(65) Prior Publication Data

US 2003/0191934 A1  Oct. 9, 2003

(51) Int. Cl.
G06F 21/00 (2006.01)
H04L 9/00 (2006.01)

(52) U.S. Cl. .............................. 713/186; 726/4; 726/21

(58) Field of Classification Search ...................... 726/2, 726/5; 713/186; 709/229
See application file for complete search history.

(56) References Cited

U.S. PATENT DOCUMENTS

| | | | |
|---|---|---|---|
| 5,229,764 A * | 7/1993 | Matchett et al. | 340/5.52 |
| 5,696,898 A * | 12/1997 | Baker et al. | 726/12 |
| 5,802,199 A | 9/1998 | Pare, Jr. et al. | |
| 2003/0018786 A1 * | 1/2003 | Lortz | 709/226 |
| 2003/0097593 A1 | 5/2003 | Sawa et al. | 713/201 |
| 2003/0110397 A1 * | 6/2003 | Supramaniam et al. | 713/201 |
| 2003/0115344 A1 * | 6/2003 | Tang et al. | 709/229 |
| 2003/0115484 A1 * | 6/2003 | Moriconi et al. | 713/201 |
| 2003/0136835 A1 * | 7/2003 | Chung et al. | 235/386 |
| 2003/0208684 A1 * | 11/2003 | Camacho et al. | 713/186 |
| 2004/0167984 A1 * | 8/2004 | Herrmann | 709/229 |

FOREIGN PATENT DOCUMENTS

| | | |
|---|---|---|
| EP | 1 326 156 A2 | 7/2003 |
| WO | 99/50734 A1 | 10/1999 |
| WO | WO 00/69120 A1 | 11/2000 |
| WO | 01/65375 A1 | 9/2001 |
| WO | WO 02/14974 A2 | 2/2002 |
| WO | 03/062969 A1 | 7/2003 |

\* cited by examiner

*Primary Examiner*—Gilberto Barron, Jr.
*Assistant Examiner*—Samson B Lemma
(74) *Attorney, Agent, or Firm*—Perkins Coie LLP

(57) ABSTRACT

In accordance with the invention there is provided a method of authorizing an individual comprising the steps of: receiving authorization data from the individual; determining based on previously stored data, at least a processor for performing an authorization process; using the at least a processor and the authorization data, performing the authorization process to one of authorize an individual and fail to authorize the individual; and wherein stored data results in different determined processors for different authorization operations and wherein at least some of the authorization operations are determined for performance by a same server processor.

47 Claims, 5 Drawing Sheets

MEDIA ROUTER

FIELD OF THE INVENTION

This invention relates to a method for accessing a computer system when numerous users are willing to access the system in the same period of time and more specifically to a method of distributing the security system processing for allowing access to everyone without overloading the computer system.

BACKGROUND OF THE INVENTION

It becomes more and more difficult to think of a domain where computers are not involved. Their use is now ubiquitous and we have learned to rely and depend on them. Consequently, we are almost disorganized if they are temporarily unavailable for any reasons. Indeed, computers are used to store personal information, companies' data, research, calculate, trade, contact, perform word processing, etc, and they have to be secure whereby access to a computer or a network is limited to authorized persons only. Therefore, protecting stored information from unauthorized access is a very important concern and is of growing concern for the future.

Security systems already exist for protecting access to a computer or a network of a company. A multi-login security system for example is a system wherein access to any particular system from a computer network automatically displays the security window of this particular system. When a user wants to access Windows®, for example, a display prompts the user to enter his security clearance in the form of a password, for example, that has to be recognized by Windows it prior to authorizing the user. A similar routine will operate if the user wants to access another system. With such a security system, a user has to go through as many security operations as the number of systems he has to access. A security system is for protecting a network, for example, from unauthorized individuals, not for preventing the authorized individuals from using a computer because it is such a burden to reiterate security operations.

Conversely, a single login security system is a system wherein a user is prompted to enter his security clearance in the form of a password, for example, which upon acceptance of the password allows the user to access any particular system within a network. However, for obvious security reasons, the operations the user is authorized to perform are limited in any of the particular systems. Therefore, to perform more operations, the user must qualify for an increased security level.

Computer networks typically store information such as user profiles, user authorization for access, and vast amounts of data. End user terminals are a critical component of the computer network, in that they provide external access to the network by offering a way of transmitting input data to the network and by offering a way of reading information from the network. Each of these terminals poses a security risk to data stored on the network and controlling unauthorized access to the data stored on the network is of critical importance.

U.S. Pat. No. 5,229,764 to Matchett et al. discloses a method of continuously analyzing biometric data from a biometric input device at intermittent intervals and selectively granting or denying access to a particular protected system based on the biometric input. The system is a continuous biometric authentication, which reads from a variety of biometric personal identification devices. The system acts as a continuously functioning "gate" between a protected system and a prospective user. Biometric data pertaining to a prospective user is stored for reference within the system. Upon a prospective user wishing to gain access to the protected system the user must interface with the system, which compares the prospective user's biometric data to the stored reference data. This comparison must not only be acceptably close in similarity in order to gain access to the protected system, it must also continue to be close in subsequent comparisons in order for access to the protected system or device to continue.

There are two different paradigms in computer network security. A first paradigm, the distributed network security model, provides for security at each of numerous points of network entry that are each independent. Thus, every computer within a network would require a user authorization operation in order to provide network access, but that operation is provided wholly within the computer itself. In the centralized security model, the process of user authorization is performed by a small number of central processors, typically one or two. In order to support such a system, every computer provides access only upon receiving from the central processors a signal indicative of proper user authorization. Of course, the latter model is less susceptible to tampering and therefore considered far more secure. The former model is less susceptible to communication delays and is therefore considered more convenient.

For example, a financial trading company following the centralized security model that employs 7,000 employees that use 7,000 computers for trading operation is inundated with authorization requests when the market opens at 9:30 am. It is most likely that the 7,000 employees arrive between 9:00 and 9:30 am and log in to the server for performing their job shortly after arrival. As will be evident to a person with skill in the art, at such a company requests for a security system to authorize employees are numerous during peak hours. When this security system is in the form, for example, of biometric system based on recognition of fingerprint information, the processing required may be onerous. Even if the recognition system is fast, imaging a fingertip, characterizing and processing the fingerprint and authorizing an individual based on a comparison of the imaged fingertip and a stored template of the fingerprint takes some time. If such a process lasts 1 second, to authorize each of 7,000 employees takes almost 2 hours, and there is just half an hour between 9:00 and 9:30 am. Further, due to the load the company server may fail due to processing overload or get bogged down with authentication requests.

To avoid this inconvenience, a network is implemented with a faster more reliable security server, which though effective, is quite costly. Unfortunately, when it is time to upgrade the authentication method, the server often needs upgrading. This limits flexibility in authentication method upgrades. Upgrading a server is costly due to data transfer and testing requirements therefor. Alternatively, a simpler less robust form of user authorization is used to alleviate performance requirements of the server. This is undesirable since it affects the ability to adequately secure data and operations. Another alternative is to spread the employee arrival times over a longer period of time, in this case 3 hours instead of 30 minutes. This results in all the personal of a company not being present for a large part of a working day; this is not optimal because employees often need to communicate with each other or with customers during a normal business day.

Using a server for performing all the operations and storing all the data of a networking system and overall for verifying, recognizing and authenticating a user loads the server processor. Therefore, it is advantageous to offload processing by performing the processing tasks on a workstation in communication with the server.

The obvious solution is to employ the distributed security model. For example, a fingerprint recognition system is provided at each workstation. In this example, a user presents a fingertip to an imager; an image corresponding to the fingerprint is characterized, analyzed, compared to templates stored in a memory of the workstation in order to determine a user authorization. Depending upon the determined user authorization, the user is recognized and a message is sent from the computer to the server indicating that the server is accessible to the user. Alternatively, if the user is not recognized and no message is sent to the server, the user has no access to the server. However, it is possible to temporarily disconnect a computer from the server. The disconnected computer can be hacked, for example by introducing a Trojan horse application thereto. When the computer is reconnected to the server, the Trojan horse application detects a password or authorization code for example, which renders the security system obsolete. Alternatively, the workstation is hacked such that the user authorization process succeeds even when incorrect data is provided thereto. Such a modification would circumvent network security and would pose a significant threat to data security and operations.

A solution to overcome such inconvenience is to use a smart card wherein user authorization information are stored in a fingerprint recognition system such that upon recognition of a user, the smart card authorizes access to the server. However, this solution also presents some limitations. For example, it does not overcome the time problem for processing the fingerprint and comparing an image of the fingerprint with the smart card information in order to authorize or not authorize a user. Furthermore, it does not prevent the system from being breached because smart cards can be hacked too, which renders the security system obsolete.

In essence, there are competing concerns in network security. Clearly a centralized security system is advantageous for upgradability, monitoring, and fixing of security problems therewith. A distributed security systems is advantageous for load distribution, and user convenience. Unfortunately, heretofore, effective compromises between the advantages of each system have been hard to achieve.

An object of this invention is to provide a security system that relies on specific security policy.

A further object of the present invention is to provide a security system that performs security verifications according to pre-determined security levels.

A further object of the present invention is to provide a security system wherein a server performs part of the security verification and a further system completes the verification.

SUMMARY OF THE INVENTION

In accordance with the invention there is provided a method of authorizing an individual comprising the steps of: receiving authorization data from the individual; determining based on previously stored policy data, at least a processor for performing an authorization process; using the at least a processor and the authorization data, performing the authorization process to one of authorize an individual and fail to authorize the individual; and wherein stored policy data results in different determined processors for different authorization operations and wherein at least some of the authorization operations are determined for performance by a same server processor.

In accordance with the invention there is provided a method of authorizing an individual comprising the steps of: receiving authorization data from the individual; determining based on previously stored policy data, processors for performing an authorization process; and using the processors and the authorization data, performing the authorization process to one of authorize an individual and fail to authorize the individual.

In accordance with the invention there is provided a system comprising: a network of processors in communication one with another, the processors other than enclosed within a same housing; a server processor in communication with the network of processors; a data input port for receiving authorization data from an individual and other than directly coupled to the server processor; a first processor other than the server processor for retrieving previously stored policy data and for determining based on the previously stored policy data, at least a processor for performing an authorization process; and, a plurality of authorization processors for performing the authorization process to one of authorize an individual and fail to authorize the individual, wherein stored policy data results in different determined processors for different authorization operations and wherein at least some of the authorization operations are determined for performance by the server processor.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
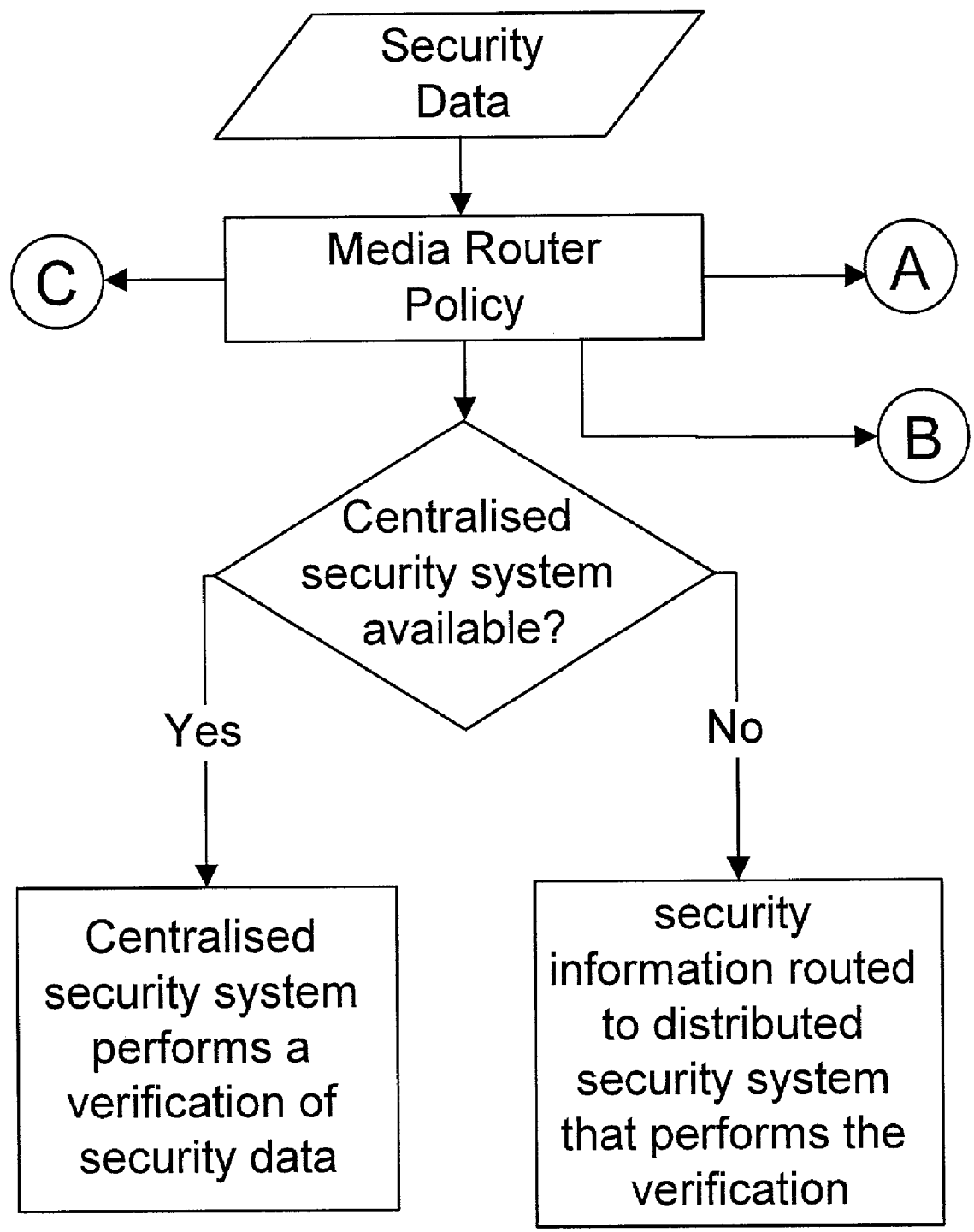
FIG. 1 is a method of routing security process according to an embodiment of the present invention.

Referring now to FIG. 1, a method of routing a security process is shown. A user provides a computer system with security information that may be in the form of biometric information provided to a biometric information imager. A media router in the form of a processor detects the provision of the security information data and consults a policy of the computer system to determine an effective security process for the request and for the network. Though several possible security processes are determinable as is indicated by the letters A, B, and C, the diagram only reflects a single policy outcome for simplicity and ease of explanation. Here the access request is related to a policy requiring centralized security processing when available or local security processing when the central processor is heavily loaded. If the centralized security system is accessible, the security data provided by the user are routed to the central security system. The central security system performs a security verification and according to the results of the verification allows or denies access from the computer system to the requested network access. If the central security system is not accessible, then, the security data provided by the user are routed to a distributed security system, which is then responsible for the security verification of the user.

Advantageously, routing the security data to a peripheral security system prevents overload of the central security system. As is apparent to a person with skill in the art, the advantages provided by routing security information to distributed security processors is controllable based on the policy of the computer network. Of course, the security policy or the processor for authenticating or rejecting a user depends on the security criteria a company or an individual want to install for protecting their network and optionally depends upon the type of access request initiated.

Figure 2:
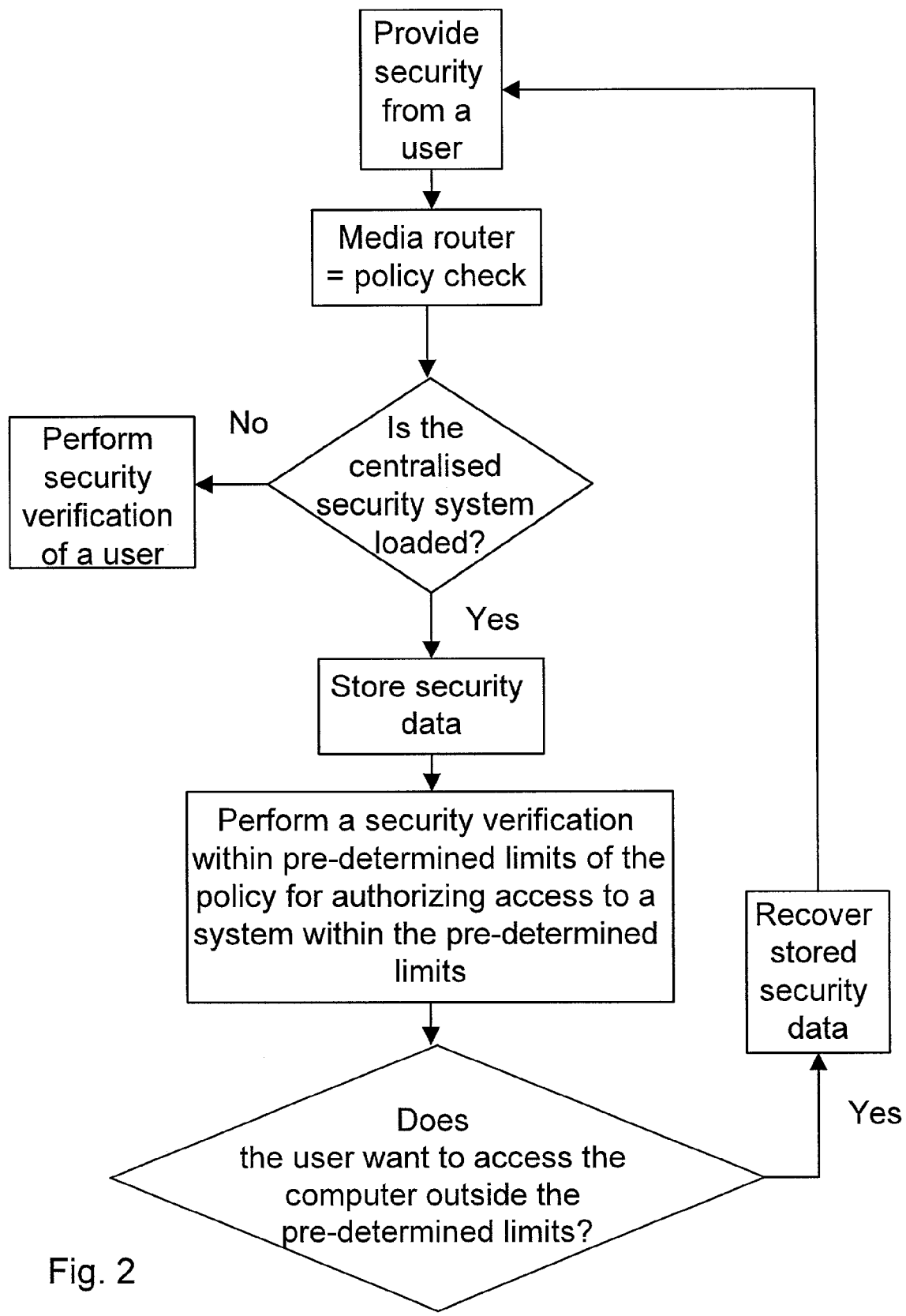
FIG. 2 is an example of a security verification performed according to a security policy based upon a loading estimation.

Referring now to FIG. 2 an example of security verification performed according to a security policy based upon a loading estimation is shown. Further to what was shown in FIG. 1 where the accessibility of the computer system is based on an estimation of the load of the central security system, in FIG. 2, the central security system performs a security verification according to predetermined limits established by the security policy even when the central security system is loaded. Of course, when a security clearance is performed within such predetermined limits, the user, if authorized, is allowed to access the computer system only within the predetermined limits established by the security policy. In the case of an unavailability of the central security system, the information security data is stored such that if the user is willing to access the computer system outside the predetermined limits, the stored security information data are retrieved for performing the security verification at a later time. If at this time the centralized security system is accessible, it performs the security verification for authorizing or eventually denying access to the computer system. In the meantime, the user is provided access to the network only in accordance with those policies allowing network access without central security processing of user authorization requests. This, for example, is limited to company social events, non-classified documents, company phone lists, and so forth. Of course, a company may divide its security into many levels and have policies governing each such level.

Optionally, when security data are temporarily stored for later security verification, it is preferred that the temporarily stored security data are erased from the computer system once they have been processed. Storing of security data for later processing allows the central security processor to load balance more effectively by presenting real time requests and queuing requests for later verification such that the security processor removes items from the queue only when it has no immediate requests pending.

Figure 3:
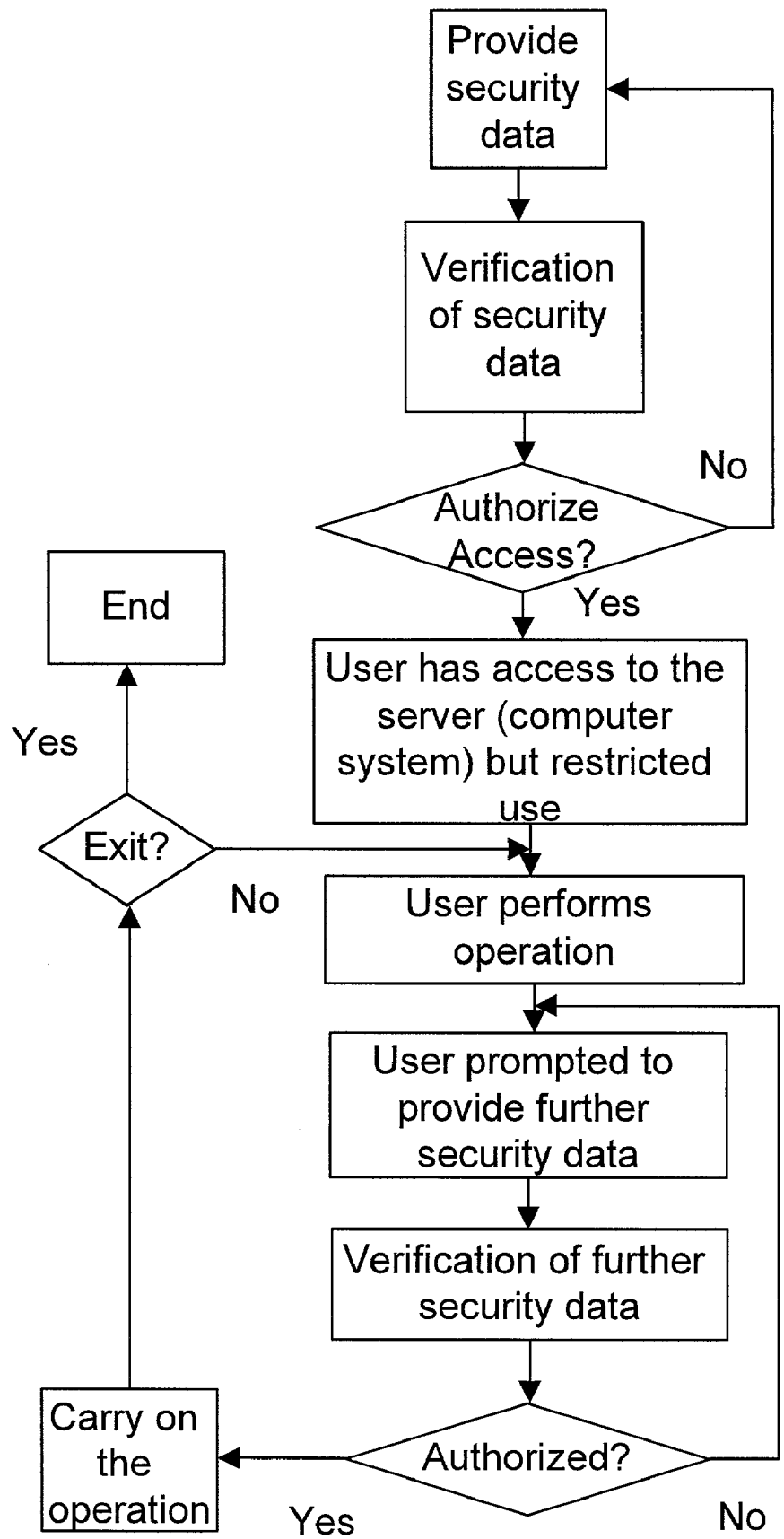
FIG. 3 is an example of a security verification performed according to a security policy based upon authentication of the operation performed on the computer system.

Alternatively, as shown in FIG. 3, a user is given access to a computer network within predetermined limits such that the security verification process for every one to access the computer network does require extensive processing resources of the central security processor. Using a smart card for accessing a computer network or a server is useful because it allows process distribution. For example, the central server verifies that a smart card is a trusted smart card. The smart card authentication process is therefore trusted and relied upon by the server. Since verifying of a smart card is possible using substantially less processing time, the server verifies many smart cards in a same amount of time that it verifies only 1 fingerprint. Thus, the processing is separated into two parts, verifying the process and performing the process, which allows for partial security process distribution. Another example of partial security process distribution involves characterizing a fingerprint with a smart card and then verifying the characterized fingerprint on the central security server. Since the characterization process is the time consuming process in fingerprint authentication, such method greatly reduces load on the central security processor.

By reducing the load on the security processor, the network policy is implementable with increased security overall. For example, each user has to authenticate themselves before any of a predetermined set of operations is stored/performed. For example, with a trading company, a user is given general access to the network upon provision of security data and verification thereof. However, in order to record any trading operation, the user must once again be authorized. With a central security process, this may not be achievable in a cost effective and flexible fashion. That said, by distributing the user authorization process between more than one processor, the process is supportable even during times of heavy usage. Alternatively, depending on the load of the server, the security verification is postponed to a further time and performed without preventing the user from performing work related duties.

Figure 4:
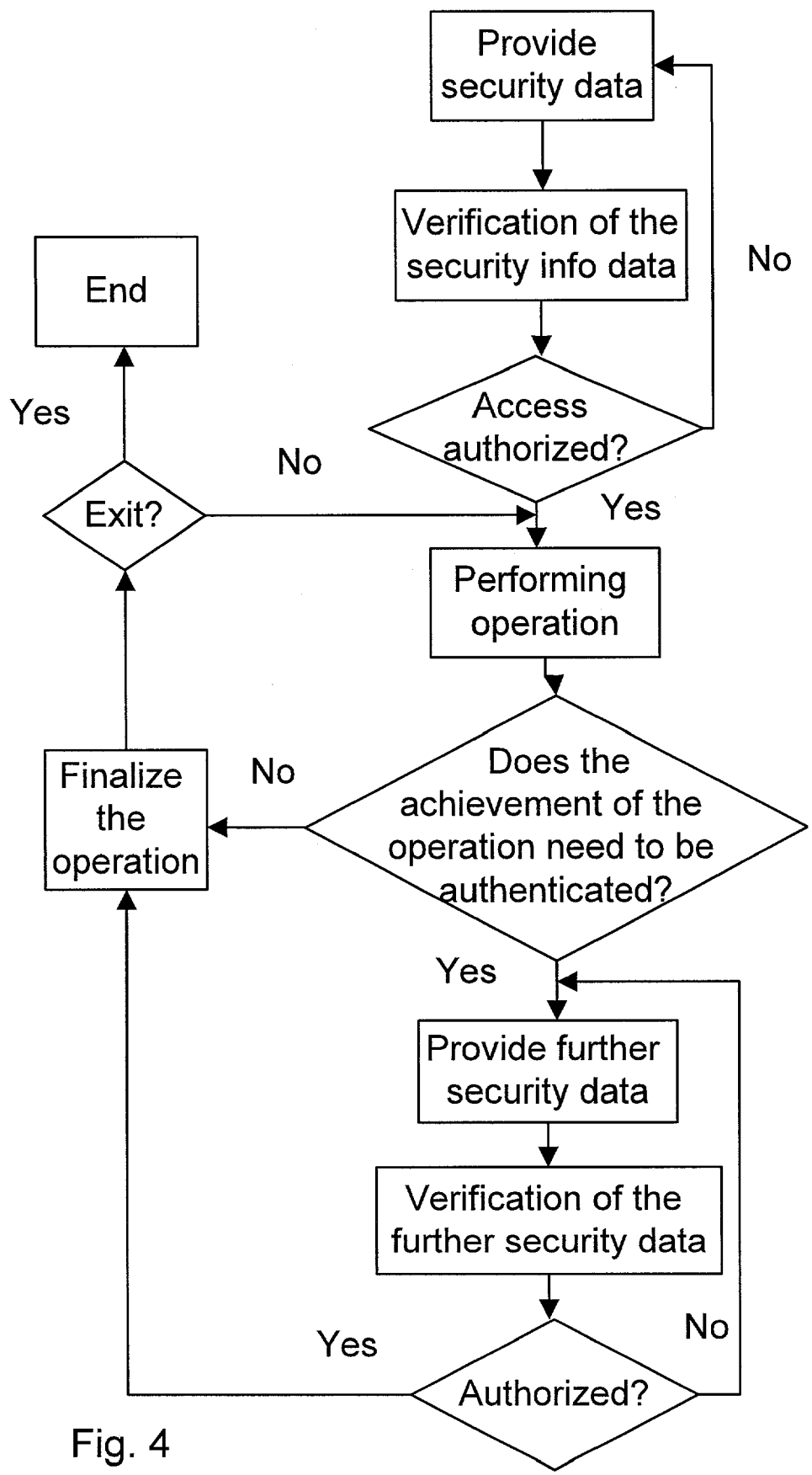
FIG. 4 is an example of a security verification randomly operating.

Alternatively, as shown in FIG. 4, instead of authenticating each operation by the provision of a new set of security information data in the form of a fingerprint for example, a user is prompted to do so at intervals. For instance, after the seventh operation, a security routine is executed requiring the provision of security data by the user. This limits damage caused by an unauthorized user while reducing load on the security processors. It is very useful in applications wherein each operation is unlikely to result in significant costs to the company. Alternatively, the security verification is randomly performed which prevents the user routine from being exploited by dishonest parties.

Inconveniently, if a user is rejected—falsely rejected or correctly rejected—, his operations will not be authenticated and therefore will not be performed. However, when a user is not identified when he provides a same fingertip onto a fingerprint imager for authenticating his requests, the security process of the computer system or server prompts the user to provide a further fingertip to be imaged. Of course, to prompt a user to provide another fingertip depends on the security policy of the computer system. As another possibility, when a user is accepted by a non-central processor, the acceptance result is passed onto a central processor for verification thereof. This provides a model wherein verification is performed locally and then re-verified centrally only upon successful verification. It allows for auditing of distributed verification processes, random verifications thereof, and/or limited verification operations on the central processor with more extensive verification operations performed by the distributed verification processes.

Figure 5:
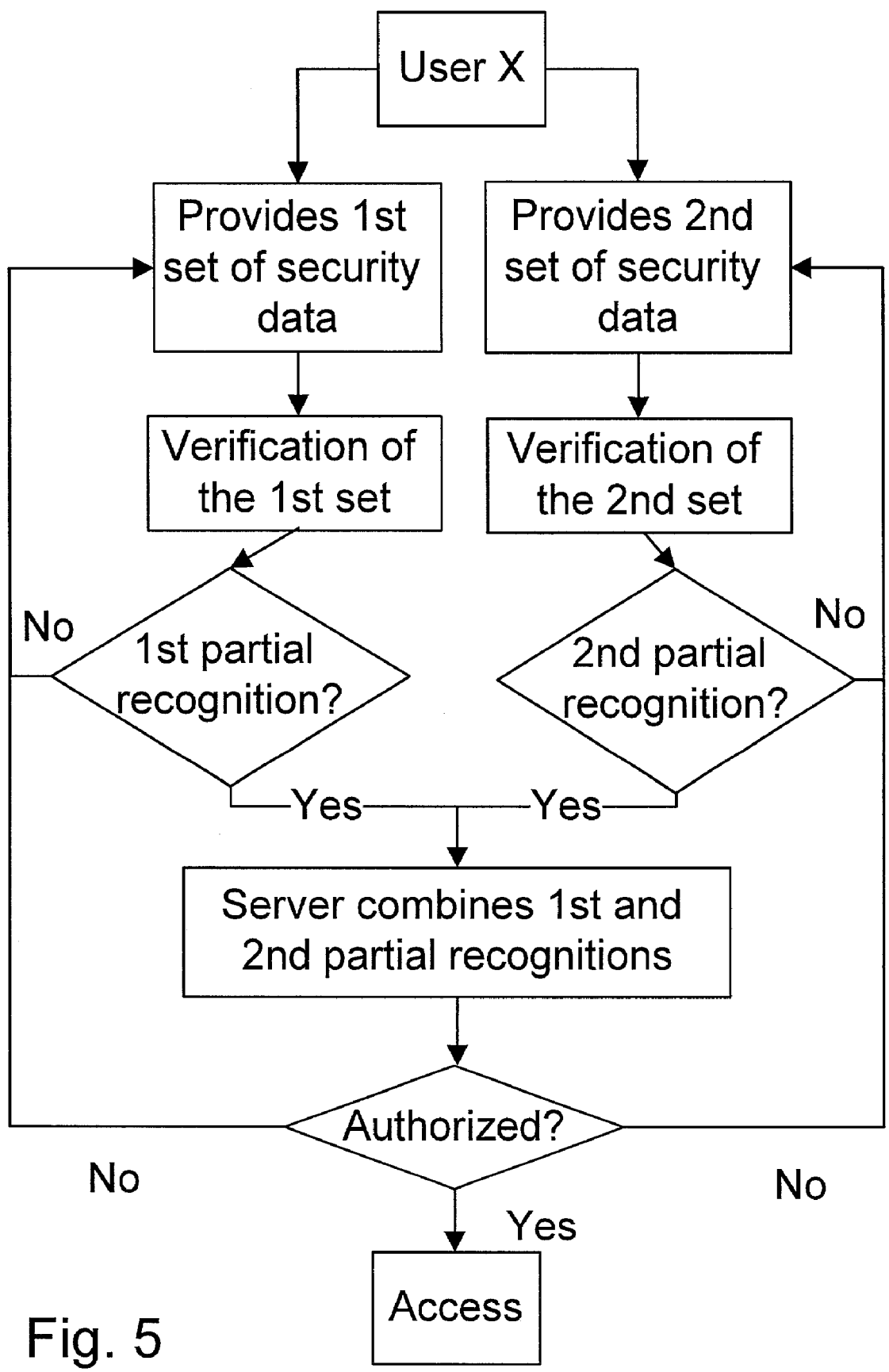
FIG. 5 an example of a security verification performed according to a security policy based upon combination security information data.

Another embodiment of the present invention is shown in FIG. 5. Here, a user is authorized to access a server based upon a combination of different security data provided by a user from different sources. A user provides a set of security data in the form of, for example, security data stored on a smart card as a first instance and a password as a second instance—the two instances forming the set. The set of security data are verified either together or independently and eventually, the system determines a user verification based on both instances that is indicative of the user being one of authorized and not-authorized. Then, the security system provides the user with access to the server in dependence upon the determined user verification.

As is apparent to a person with skill in the art, the authorization procedures hereindescribed are procedures that reroute the security verification operations from a central server to at least another processor and therefore discharge some of the potential load from the server. This increases server reliability, server performance, and network convenience. Many combinations are possible for achieving such a purpose. However, the security policies that are chosen for protecting a network or a plurality of interconnected servers preferably does not overload the users' computer systems with too many security verification processes resulting in impeded performance of another form in the place of the present security server bottleneck problem that the invention seeks to overcome.

Preferably, security policies are stored in a distributed fashion such that policy access requests do not form a communication bottleneck thereby preventing the invention from alleviating delays in security processing. One such implementation is to store network security policies on many distributed systems within the network in a secure fashion only accessible to the network security process in operation within the network.

Numerous other embodiments may be envisaged without departing from the spirit or scope of the invention.

What is claimed is:

1. A method of authorizing an individual, the method comprising:
   receiving biometric data from the individual;
   determining based on previously stored policy data which processors of a plurality of processors in a distributed security system to use to perform an authorization process, wherein the stored policy data is used to determine whether a first processor of a centralized security system is available to perform an authorization process including registering the received biometric data against previously stored biometric data for authentication of the individual who provided the received biometric data, and further wherein the stored policy data is indicative of the first processor for performing the authorization process and a second other processor in a distributed security system for performing the authorization process when the first processor is loaded;
   if the first processor of the centralized security system is available, using the first processor of the centralized security system and the received biometric data to perform the authorization process to either authorize the individual or fail to authorize the individual; and
   if the first processor of the centralized security system is not available, performing the authorization process on the second processor within the distributed security system based on the stored policy data and the received biometric data to either authorize the individual or fail to authorize the individual.

2. The method of claim 1 wherein the first processor is a central security processor of the centralized security system.

3. The method of claim 1 wherein when the first processor of the centralized security system is loaded, the received biometric data are also provided to the first processor of the centralized security system for queuing the received biometric data such that when the first processor of the centralized security system is other than loaded, the received biometric data is verified thereby.

4. The method of claim 1 wherein the individual is prompted to provide biometric data at intervals such that the first and/or second processor performs the authorization process at intervals whereby the individual obtains increased levels of authorization as each interval of the authorization process is performed.

5. The method of claim 4 wherein upon certain predetermined user actions, the individual is prompted to provide additional biometric data to authorize a predetermined user action according to a further interval of the authorization process based on the stored policy data and the predetermined user action.

6. The method of claim 5 wherein the further interval of the authorization process is performed on a different processor from the processor that performed a previous interval of the authorization process.

7. The method of claim 1 wherein upon certain predetermined user actions, the individual is prompted to provide additional biometric data to authorize a predetermined user action according to a further interval of the authorization process based on the stored policy data and the predetermined user action.

8. The method of claim 1 wherein the second processor within the distributed security system that performs the authorization process is verified by a further processor within the distributed security system for determining a reliability of the authorization operation performed by the second processor.

9. The method of claim 1 wherein a plurality of processors within the distributed security system are determined for performing the authorization processing and wherein a set of instances of biometric data is provided to the determined plurality of processors, each processor from the determined plurality of processors independently performing a different authorization operation.

10. The method of claim 9 wherein a combination of the different authorization operations performed by each determined processor results in either authorizing or failing to authorize the individual.

11. The method of claim 10 wherein an instance of biometric data from the set of biometric data is information stored on a smart card.

12. The method of claim 10 wherein an instance of biometric data from the set of biometric data is a password.

13. The method of claim 1 wherein an authorization operation performed by the processor that performs the authorization process comprises hashing the biometric data, and wherein a second authorization operation performed by another processor comprises verifying the hashed biometric data against stored biometric data.

14. The method of claim 1 wherein receiving biometric data comprises:
   receiving biometric information at a biometric sensor;
   generating the biometric data in response to the sensed biometric information;
   providing the biometric data to the processor that performs the authorization process for characterizing the biometric data; and
   providing the characterized biometric data to a further processor for registering the characterized biometric data against the previously stored biometric data.

15. The method of claim 1 wherein the processor that performs the authorization process is determined based on which processors have previously performed the authorization process such that a same processor is not used every time.

16. A method of authorizing an individual, the method comprising:
   receiving biometric data from the individual;
   determining based on previously stored policy data which processors of a plurality of processors in a distributed security system to use to perform an authorization process including registering the received biometric data against previously stored biometric data for authentication of the individual who provided the received biometric data to either authorize the individual or fail to authorize the individual;

providing an instance of biometric data to each of the determined processors, each processor independently performing a different authorization operation; and using the determined processors and the biometric data to perform the authorization process, wherein a combination of the different authorization operations performed by each determined processor results in either authorizing or failing to authorize the individual.

17. The method of claim 16 wherein a combination of the different authorization operations performed by each determined processor results in either authorizing or failing to authorize the individual.

18. The method of claim 17 wherein an instance of biometric data is biometric information stored on a smart card.

19. The method of claim 17 wherein an instance of biometric data is a password.

20. The method of claim 16 wherein an authorization operation performed by one of the determined processors comprises hashing the biometric data, and wherein a second authorization operation performed by another of the determined processors comprises verifying the hashed biometric data.

21. The method of claim 16 further comprising:
verifying a reliability of the authorization process performed by a first processor of the determined processors with a second other processor of the determined processors; and
using the second processor of the determined processors to perform either authorizing or failing to authorize the individual based upon an authorization process and the result of the verification.

22. The method of claim 16 further comprising:
using a first processor of the determined processors to perform either authorizing or failing to authorize the individual based upon an authorization process;
providing data relating to the authorization process and the result thereof to a second other processor or the determined processors; and
auditing the authorization process of the first processor using the second other processor.

23. A system, comprising:
a network of processors configured to communicate with each other, the processors other than enclosed within a same housing;
a server processor configured to communicate with the network of processors;
a data input port configured to receive biometric data from an individual; and
a first processor other than the server processor configured to retrieve previously stored policy data and to determine, based on the previously stored policy data, which processor of a plurality of processors in a distributed network of security processors to use for performing an authorization process, wherein the authorization process includes registering the received biometric data against previously stored biometric data for authentication of the individual who provided the biometric data, and wherein the stored policy data is indicative of the server processor for performing the authorization process and at least one of the processors in the network of processors for performing the authorization process when the server processor is loaded,
wherein the server processor and/or at least one processor of the network of processors performs the authorization process using the received biometric data to either authorize an individual or fail to authorize the individual.

24. The system of claim 23 wherein, when the server processor is loaded, the received biometric data are also provided to the server processor for queuing the received biometric data such that when the server processor is not loaded, the received biometric data is verified thereby.

25. The system of claim 23 wherein the biometric data is provided via the data input port at intervals such that at least one of the processors specified by the stored policy data performs the authorization process at intervals, and whereby the individual obtains increased levels of authorization as each interval of the authorization process is performed.

26. The system of claim 25 wherein additional biometric data is provided via the data input port to authorize a predetermined user action according to a further interval of the authorization process based on the stored policy data and the predetermined user action.

27. The system of claim 26 wherein the further interval of the authorization process is performed on a different processor than the processor that performed a previous interval of the authorization process.

28. The system of claim 23 wherein the processor that performed the authorization process is verified by another processor for determining a reliability of the authorization operation performed by the processor that performed the authorization process.

29. The system of claim 23 wherein some processors of the network of processors are provided a set of instances of the biometric data, each processor that receives the set of instances of the biometric data independently performing a different authorization operation.

30. The system of claim 29 wherein a combination of the different authorization operations performed by each processor that receives the set of instances of biometric data results in either authorizing or failing to authorize the individual.

31. The system of claim 30 further comprising a smart card for storing an instance of biometric data from the set of instances of biometric data.

32. The system of claim 30 wherein an instance of data from the set of instances of biometric data is a password.

33. The system of claim 23 wherein the processor that performs the authorization process hashes the biometric data, and another processor performs a second authorization operation that includes verifying the hashed biometric data against stored biometric data.

34. The system of claim 23 further comprising:
a biometric sensor configured to receive biometric information and generate the biometric data in response to the sensed biometric information, and
wherein the biometric data is provided to the processor that performs the authorization process for characterizing the biometric data, and the characterized biometric data is provided to another processor for registering the characterized biometric data against the previously stored biometric data.

35. The system of claim 23 wherein the stored policy data specifies different processors for different authorization operations and wherein at least some of the authorization operations are determined for performance by the server processor.

36. A system, comprising:
a network of processors configured to communicate with each other, the processors other than enclosed within a same housing;
a server processor configured to communicate with the network of processors;
means for receiving biometric data from an individual; and means for retrieving previously stored policy data and for determining, based on the previously stored policy data, which processor of a plurality of processors in a distributed network of security processors to use for performing an authorization process, wherein the authorization process includes registering the received biometric data against previously stored biometric data for authentication of the individual who provided the biometric data, and wherein the stored policy data is indicative of the server processor for performing the authorization process and at least one of the processors in the network of processors for performing the authorization process when the server processor is loaded, wherein the server processor and/or at least one processor of the network of processors performs the authorization process using the received biometric data to either authorize an individual or fail to authorize the individual.

37. The system of claim 36 wherein the biometric data is provided to the receiving means at intervals such that at least one of the processors specified by the stored policy data performs the authorization process at intervals whereby the individual obtains increased levels of authorization as each interval of the authorization process is performed.

38. The system of claim 37 wherein additional biometric data is provided via the receiving means to authorize a predetermined user action according to a further interval of the authorization process based on the stored policy data and the predetermined user action.

39. The system of claim 38 wherein the further interval of the authorization process is performed on a different processor than the processor that performed a previous interval of the authorization process.

40. The system of claim 36 wherein the processor that performed the authorization process is verified by another processor for determining a reliability of the authorization operation performed by the processor that performed the authorization process.

41. The system of claim 36 wherein some processors of the network of processors are provided a set of instances of the biometric data, each processor that receives the set of instances of the biometric data independently performing a different authorization operation.

42. The system of claim 41 wherein a combination of the different authorization operations performed by each processor that receives the set of instances of biometric data results in either authorizing or failing to authorize the individual.

43. The system of claim 42, further comprising a smart card for storing an instance of biometric data from the set of instances of biometric data.

44. The system of claim 42 wherein an instance of data from the set of instances of biometric data is a password.

45. The system of claim 36 wherein the processor that performs the authorization process hashes the biometric data, and another processor performs a second authorization operation that includes verifying the hashed biometric data against stored biometric data.

46. The system of claim 36, further comprising:
a biometric sensor configured to receive biometric information and generate the biometric data in response to the sensed biometric information, and
wherein the biometric data is provided to the processor that performs the authorization process for characterizing the biometric data, and the characterized biometric data is provided to another processor for registering the characterized biometric data against the previously stored biometric data.

47. The system of claim 36 wherein the stored policy data specifies different processors for different authorization operations, and wherein at least some of the authorization operations are determined for performance by the server processor.

* * * * *